United States Patent [19]

Williams et al.

[11] 4,201,412
[45] May 6, 1980

[54] CAMPING CAR

[76] Inventors: Smith J. Williams, c/o George Spector, 3615 Woolworth Bldg., 233 Broadway; George Spector, 3615 Woolworth Bldg., 233 Broadway, both of New York, N.Y. 10007

[21] Appl. No.: 935,020

[22] Filed: Aug. 18, 1978

[51] Int. Cl.² ............................................. B60J 7/00
[52] U.S. Cl. ............................ 296/163; 180/24.02; 296/137 B
[58] Field of Search ................ 180/21, 24.02, 41; 280/80 R, 638, 656; 105/170 A; 296/15, 137 R, 137 B, 136, 160, 163

[56] References Cited

U.S. PATENT DOCUMENTS

| | | | |
|---|---|---|---|
| 2,767,995 | 10/1956 | Stout | 180/21 X |
| 3,136,576 | 6/1964 | Curtin | 296/137 R X |
| 3,425,741 | 2/1969 | Korff | 296/1 S |
| 3,567,209 | 3/1971 | Lathers | 296/50 |
| 3,784,227 | 1/1974 | Rogge | 280/166 |
| 3,967,239 | 6/1976 | Steele | 180/114 X |

*Primary Examiner*—Richard A. Berisch
*Assistant Examiner*—Michael Mar

[57] ABSTRACT

A new design for an automotive passenger vehicle which is presented herewith in several different models in each of which the vehicle body upper surface is rearwardly upwardly sloped in a straight diagonal line extending from a pointed forward end for purpose of a maximum streamline, and the vehicle including a novel level lever mechanism, windows, windshield, tailgate and retractable rain canopy.

2 Claims, 15 Drawing Figures

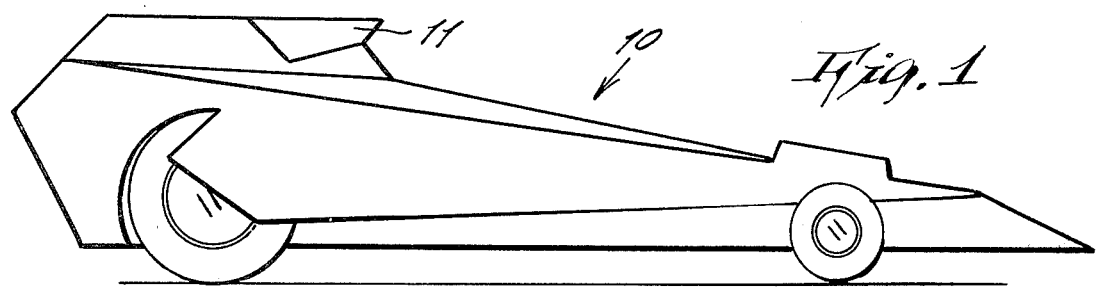
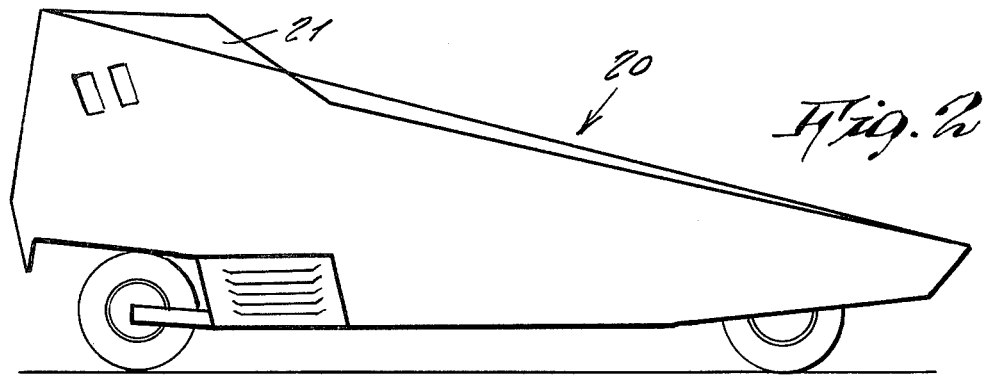
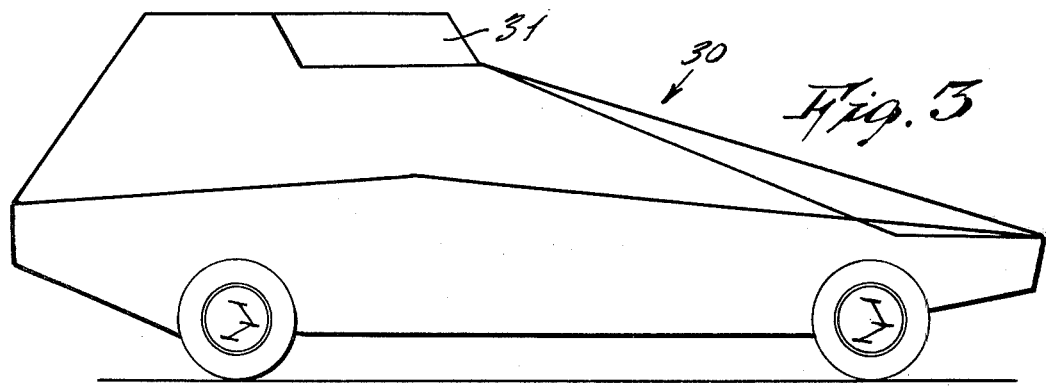
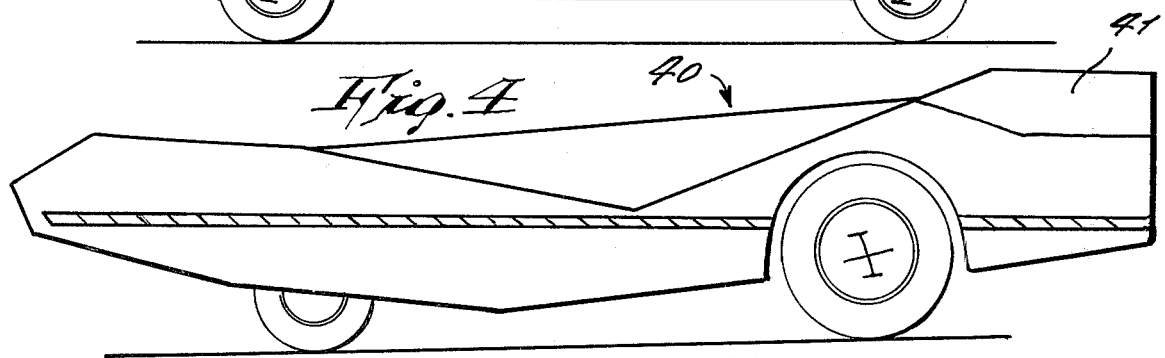
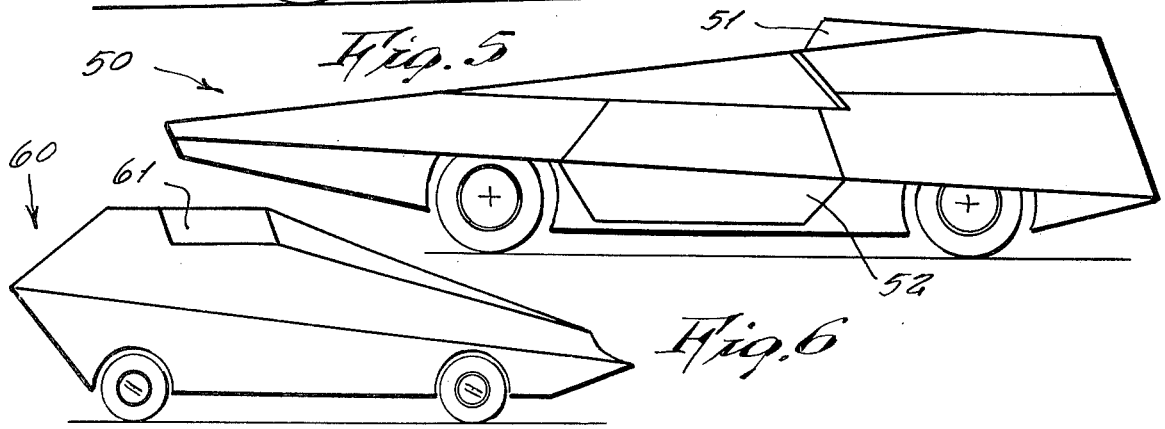

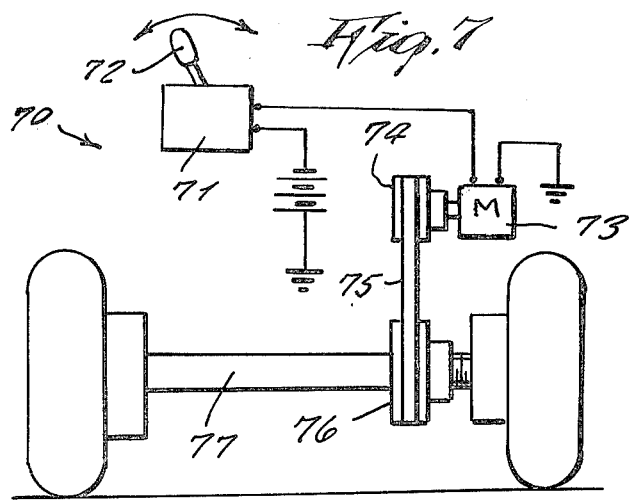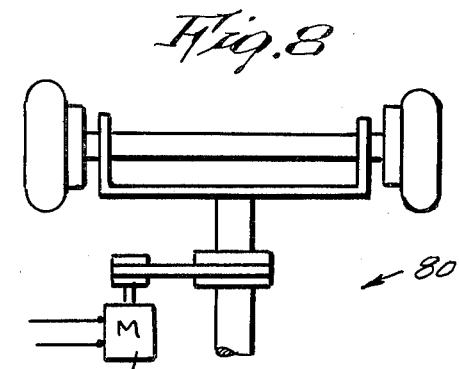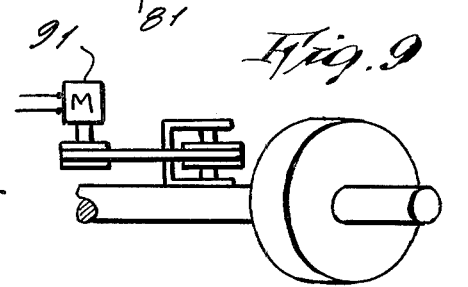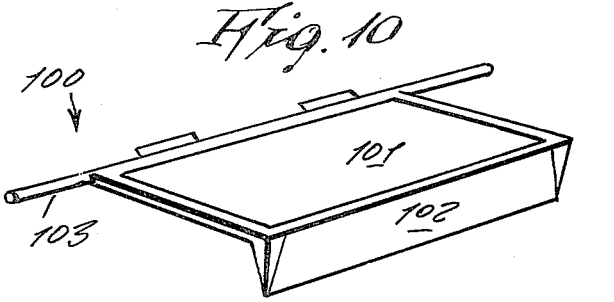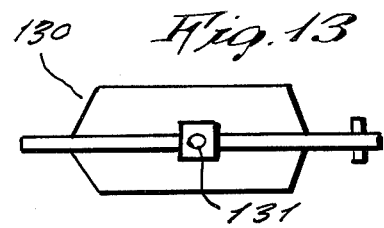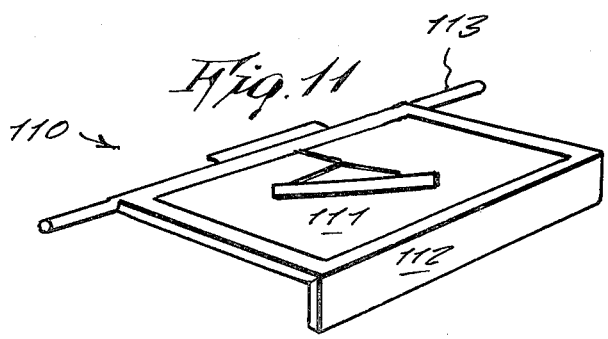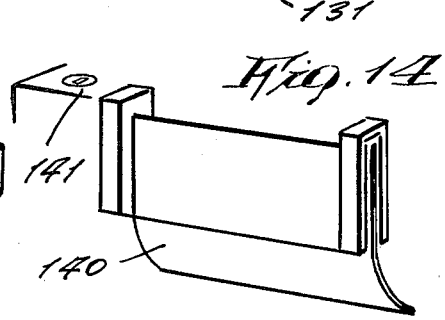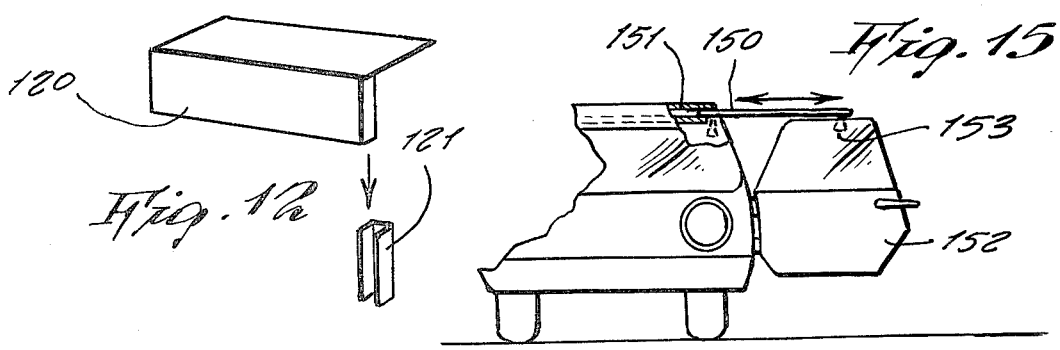

CAMPING CAR

This invention relates generally to automotive passenger vehicles.

A principal object of the present invention is to provide a vehicle having a contour that is maximum streamlined so to have minimum air drag while producing a pleasing futuristic appearance.

Another object is to provide a futuristic car that is designed particularly as a camping car.

Yet another object is to provide a futuristic camping car that includes a new type of lever mechanism that is controlled by the driver, new type windows and windshield, a novel tailgate and a rain canopy for sheltering a passenger as he gets in and out of the car, the rain canopy automatically extending outwardly and retracting inwardly into the car roof.

Other objects are to provide a future camping car which is simple in design, inexpensive to manufacture, rugged in construction, easy to use and efficient in operation.

These and other objects will be readily evident upon a study of the following specifications and the accompanying drawing wherein:

FIGS. 1 through 6 show side elevational views of different model designs of camping cars, and illustrating respectively a pen-line, a flite, a moon star, future star, rancho and Gorino.

FIGS. 7 through 9 show different designs of level levelers for a car.

FIG. 10 shows an open window design.

FIG. 11 shows a windshield design.

FIG. 12 shows a top door and track.

FIG. 13 shows a theft alarm on a tailgate.

FIG. 14 shows a tailgate that is key operated so to unlock and open up.

FIG. 15 shows another design wherein the insertion includes a metal awning that slides sidewardly out of the car roof to protect a person getting out of a car during a heavy rain.

Referring now to the drawing in detail, and more particularly to FIGS. 1 through 6 thereof at this time, there is shown a future camping car according to the present invention. The car 10 shown in FIG. 1 is a four wheel Pen-Line model camping car that includes a sleeping compartment 11. FIG. 2 shows a three wheel Flite model camping car 20 having sleeping compartment 21. FIG. 3 shows a four wheel Moon-Star model camping car 30 having a sleeping compartment 31. FIG. 4 shows a Future-Star model camping car 40 having sleeping compartment 41. FIG. 5 shows a Rancho model camping car 50 having sleeping compartment 51 and having one door 52. FIG. 6 shows a four wheel Gorino model camping car 60 having sleeping compartment 61.

Each of the above models has a rearwardly upwardly generally straight upper top side of the body and a pointed forward end.

FIG. 7 shows a level lever mechanism 70 in which a lever unit 71 located near a dashboard includes a lever 72 for being manually moved by a driver; the unit 71 being in electric circuit with a two directional motor 73 for driving a pulley 74 connected by endless belt 75 to a pulley 76 around a rear wheel axle sleeve 78 for leveling a load, it being understood that the vehicle chassis is supported on the sleeve, and the sleeve is threaded on the axle so that rotation of the sleeve respective to the axle thus balances the loaded chassis by shifting sidwardly as wished.

FIG. 8 shows a mechaism 80 that is similar to mechanism 70 in principal, the motor 81 being controlled by a similar level lever unit 71. The mechanism 80 serves the front wheel suspension. A slightly modified design of the mechanism 90 is shown in FIG. 9 wherein the motor 91 is likewise controlled by a level lever unit 71 not shown.

In FIG. 10, a window 100 of novel design is shown which incorporates window glass panels 101 and 102 at an angle respective to each other and which design is provided for use in certain of the models shown in the drawings or other variations of models that may be derived therefrom. As indicated, the window is pivotable about a pivot shaft 103 supported in suitable bearings on the vehicle body, not shown, so that a novel method is provided for opening or closing the same. All these features are also present in the windshield 110 shown in FIG. 11 wherein the same includes glass panel 111 and 112 as well as the pivot shaft 113. Thus in this vehicle, the windshield is pivotable outward of its body opening for certain uses.

FIG. 12 indicates a roof top door 120 that is slidable in tracks 121 so to provide a novel access from a top or which serves as an overhead roof port.

A theft alarm 130 shown in FIG. 13 is also provided. The device is key operated at 131.

The principal of the sliding top door is also incorporated in the tailgate 140 shown in FIG. 14, and which is likewise key operated at 141 for being slided open or closed.

In FIG. 15, a rain protection canopy 150 is normally stored within a space 151 inside the vehicle roof. It automatically slides outward therefor when the vehicle door 152 is opened; the canopy comprising a rigid panel having extension 153 downwardly so to be pulled and pushed by the swinging door. Thus in case of rain, a person is not drenched while getting in and out of the car. The extension 153 may be made retractable so to be inoperative when the weather is fair.

Thus different features are presented for a future camping car.

While various changes may be made in the detail construction, it is understood that such changes will be within the spirit and scope of the present invention as is defined by the appended claims.

What is claimed is:

1. In a camping car, the combination of an automobile having front and rear wheels and a body supported thereon sloped upwardly rearward with a pointed forward end, said automobile including windows and windshield each of which are pivotable about a pivot shaft supported on said body including an upwardly slidable roof top door and tailgate, additionally including a mechanism for adjusting the relative centers of gravity of said wheels and the vehicular load supported thereon whereby eccentricity of said centers of gravity may be reduced to minimum, and a rain protection canopy comprising a stiff panel slidably mounted in the vehicle roof adjacent a door of said vehicle, an extension on an underside of said panel being engagable with a door of said automobile, said panel being outwardly slidable over a doorway of said automobile when said door is open, and retractable inside said roof when said door is closed.

2. The combination as in claim 1 wherein said mechanism coacts with said rear wheels causing relative movement between said wheels and the vehicular load thereon, including a remote control for actuating said mechanism.

* * * * *